United States Patent
Guerrero et al.

(10) Patent No.: US 7,852,412 B1
(45) Date of Patent: Dec. 14, 2010

(54) VIDEO NOISE LEVEL DETECTION

(75) Inventors: Miguel A. Guerrero, San Jose, CA (US); Stephen D. Lew, Sunnyvale, CA (US); Gerrit A. Slavenburg, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1067 days.

(21) Appl. No.: 11/363,627

(22) Filed: Feb. 27, 2006

(51) Int. Cl.
*H04N 5/21* (2006.01)
*H04N 5/213* (2006.01)
*H04N 5/14* (2006.01)

(52) U.S. Cl. .................. 348/606; 348/616; 348/625; 348/701

(58) Field of Classification Search ............... 348/701, 348/607, 616, 180, 606, 576; 382/190, 224, 382/275
See application file for complete search history.

(56) References Cited

U.S. PATENT DOCUMENTS

| | | | |
|---|---|---|---|
| 4,242,704 A * | 12/1980 | Ito et al. ................ | 348/620 |
| 5,200,824 A * | 4/1993 | Kageyama ............... | 348/607 |
| 5,757,977 A * | 5/1998 | Mancuso et al. ......... | 382/260 |
| 5,892,550 A * | 4/1999 | Iwasaki et al. ........... | 348/443 |
| 5,931,934 A * | 8/1999 | Li et al. .................. | 710/260 |
| 2001/0048485 A1* | 12/2001 | Ueyama .................. | 348/627 |
| 2003/0052979 A1* | 3/2003 | Soga et al. .............. | 348/241 |
| 2003/0206591 A1* | 11/2003 | Yang et al. .......... | 375/240.16 |
| 2005/0013486 A1* | 1/2005 | Wiedemann et al. ..... | 382/181 |
| 2008/0266307 A1* | 10/2008 | Hofman et al. .......... | 345/581 |

* cited by examiner

*Primary Examiner*—Victor Kostak
(74) *Attorney, Agent, or Firm*—Townsend and Townsend and Crew LLP

(57) ABSTRACT

Circuits, methods, and apparatus for measuring a video signal's noise level. The determination can be made based on pixel values for a single video image frame, for example, by comparing pixel color values, luminance, or other parameter for a first and second group of pixels in the frame. Each group of pixels may be part of a line in the frame, and several such measurements may be made along each line of the frame. These measurements can then be further refined depending on the measure noise level. Once a video noise level is determined, a decision on how to further process the video signal can be made. For example, the picture can be filtered or sharpened. The amount of noise filtering can be made dependent on the amount of noise measured.

20 Claims, 9 Drawing Sheets

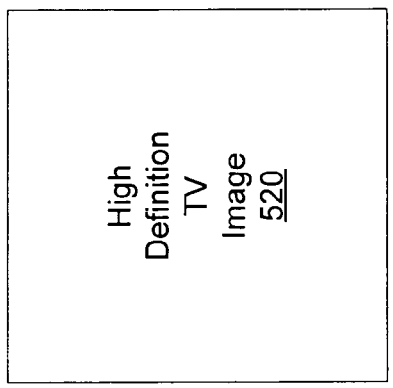
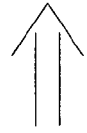
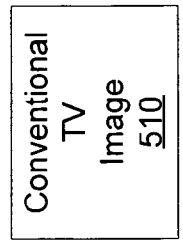
Figure 5A
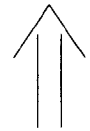
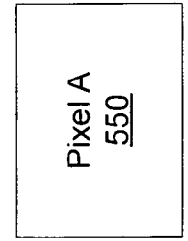
Figure 5B

VIDEO NOISE LEVEL DETECTION

BACKGROUND

The present invention generally relates to measuring video noise levels, and more particularly to measuring noise levels of digital video signals and the further processing the video signals based on the measured noise.

Digitally formatted video signals have proliferated the past several years with the rise in popularity of satellite television, DVD players, and other digital video sources. The digital conquest is almost complete, with analog video nearly relegated to an issue of backward compatibility.

At the same time, these signals are being processed by increasingly complex digital systems and integrated circuits. Examples of integrated circuits capable of tremendous amounts of video processing are those designed and developed by NVIDIA Corporation of Santa Clara, Calif. These powerful NVIDIA devices include myriad circuits such as processors for 2-D and 3-D graphics, as well as video.

While digital video signals processed by an NVIDIA device are stunningly vivid, their input video signals can be corrupted by video noise. Sources of this noise include power supply noise, transmission errors, signal coupling, and others. It is therefore desirable to use some of the abundant processing power of these NVIDIA devices to reduce video noise or to improve video images in other ways.

The first step in handling video noise is to make an accurate measurement of the video noise level. Once the amount of noise present in a video signal is known, a decision regarding how to proceed can be made.

Video images are made up of a series of frames that are viewed in rapid succession on a monitor or other type of display apparatus. Conventional solutions compare a previous frame to a current frame in order to make a noise determination. But this requires accessing previous frames, so implementing it greatly increases the number of memory accesses and reduces the memory bandwidth available for other purposes.

Accordingly, what is needed are circuits, methods, and apparatus for improving video noise level measurements. It is also desirable that these measurements be made using only a current frame.

SUMMARY

Accordingly, embodiments of the present invention provide circuits, methods, and apparatus for measuring a video signal's noise level. An exemplary embodiment of the present invention makes this determination based on pixel data in a single video image frame, though in other embodiments more than one frame of pixels is used. Once the video noise level is determined, a decision on how to proceed is made.

The video noise level can be measured by comparing the pixel color value, luminance, or other parameter for a first group of pixels with a second group of pixels in a frame. For example, the first group can be part of a first line while the second group can be part of a second line. Several such measurements are made along lines of the frame. These measurements can be further refined based on the measured noise level. In one specific embodiment, a minimum difference for the measurements along each line is found. These minimums, one for each line, are averaged over a frame to determine noise.

If the noise level is high, this unrefined level is used, though in other embodiments these measurements can undergo further processing. If the noise level is low, the measurement data is subject to further scrutiny. For example, one or more criteria can be applied to select among the measurement data, thus improving measurement accuracy. In this embodiment, if the noise is between a low and high level, the refined and unrefined levels are averaged together to determine the noise level.

Once the video noise level is found, the picture can be filtered, sharpened, or subject to other processing as appropriate. For example, if the level is noise is low, image sharpness can be increased, whereas if noise is high, noise filtering can be employed. The amount of noise filtering can be made dependent on the amount of noise measured. In other embodiments of the present invention, other types of processing may be performed, and these may depend on the measured noise level. Various embodiments of the present invention may incorporate one or more of these or the other features described herein.

A better understanding of the nature and advantages of the present invention may be gained with reference to the following detailed description and the accompanying drawings.

BRIEF DESCRIPTION OF THE DRAWINGS

FIGS. 5A and 5B illustrate the conversion of a standard video signal into a higher resolution video signal;

DESCRIPTION OF EXEMPLARY EMBODIMENTS

Figure 1:
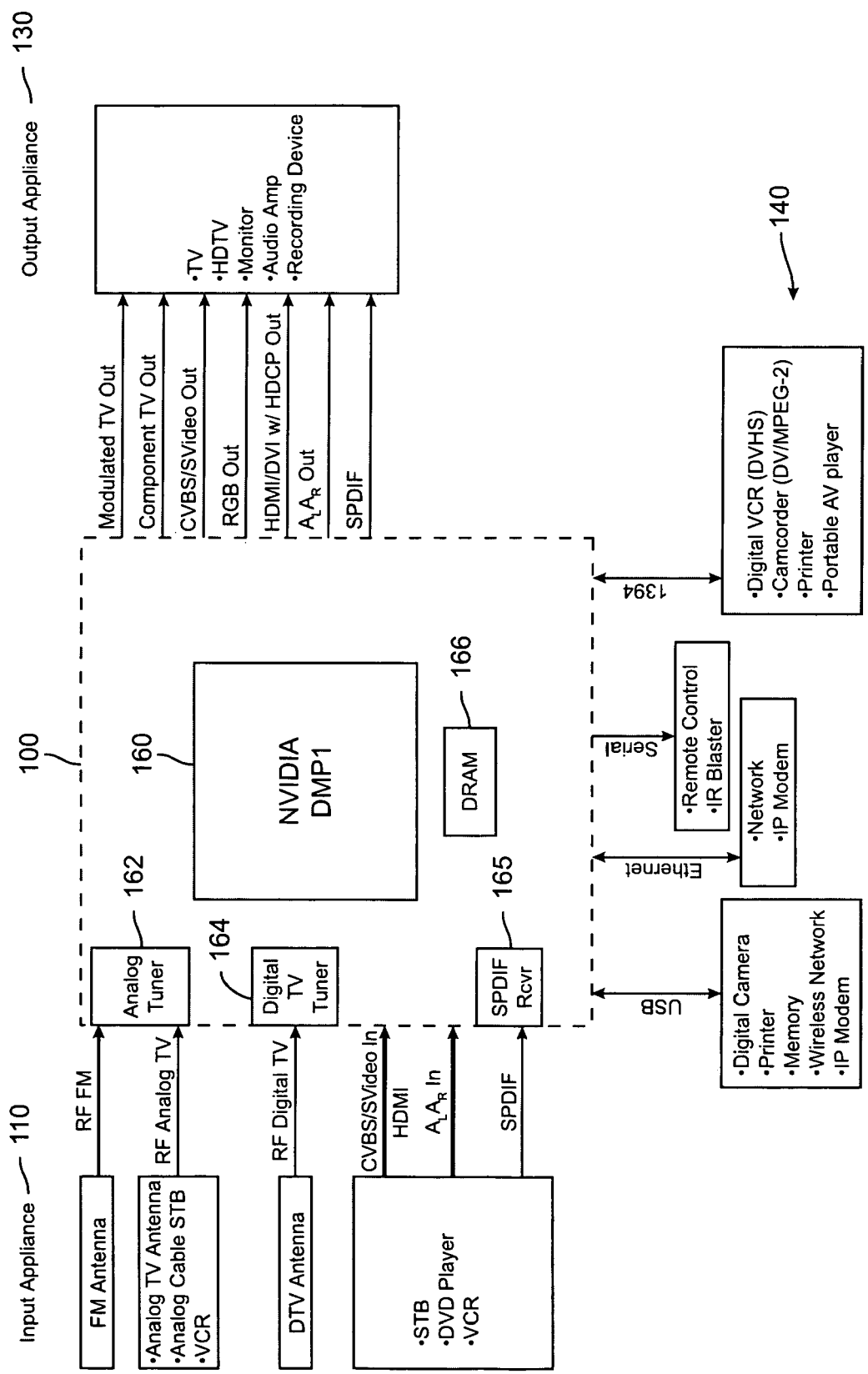
FIG. 1 is a block diagram of a media center system that is improved by the incorporation of an embodiment of the present invention.

FIG. 1 is a block diagram of a media center system that is improved by the incorporation of an embodiment of the present invention. This block diagram includes a media center 100, input appliances 110, output appliances 130, and peripheral and network devices 140. This figure, as with all the included figures, is shown for illustrative purposes and does not limit either the embodiments of the present invention or the claims.

The media center 100 may be a personal computer or other type of device. In a specific embodiment of the present invention, the media center 100 includes a Digital Media Processor integrated circuit 160 along with a number of supporting integrated circuits. The DMP 160 is preferably manufactured by NVIDIA Corporation of Santa Clara, Calif. Embodiments of the present invention may be incorporated on the DMP 160, or on another integrated circuit.

In the particular embodiment illustrated here, a number of input appliances 110 are shown, though in other embodiments, more, fewer, or other devices may be connected or in communication with the media center 100. Similarly, in this embodiment, a number of output appliances 130 and peripheral and network devices 140 are shown, though in other embodiments more, fewer, or other devices may be included. For example, one or more devices may be in communication with the media center 100 over a wireless link such as a WiFi, 802.11a, b, or g, or 802.15.3a link. These principles apply to the other specific embodiments shown herein.

In this particular example, the input appliances 110 include an FM antenna 112 providing an RF FM signal to the media center 100, and analog TV sources 114 including an analog TV signal, analog cable set-top box, and videocassette recorder providing an analog RF signal. Also included are a digital TV antenna 116, and a set-top box, DVD player, and videocassette recorder 118, which may provide a composite video, S-Video 127, component video or HDMI 127, audio $A_L A_R$ 128, or SPDIF (Sony/Philips digital interface) signal 129 to the media center 100.

Also in this example, a number of output appliances 130 are shown including a television, high-definition television, monitor, audio amplifier, and recording devices such as a VCR or digital video recorder. These devices may be driven over one or more types of signals including modulated TV output 132, component video output 133, S video output 134, RGB output 135, HDMI/DVI output 136, $A_L A_R$ output 137, or SPDIF signal 138.

A number of peripheral and network devices 140 are shown in communication with the media center 100. These devices include peripheral devices that are attached or in communication with the media center 100 using one or more standard interfaces, and network devices utilizing one or more of a number of networking standards. Included are a digital camera, printer, memory, wireless network, or IP modem 150 communicating over a USB or USB2 bus 160, a network or IP modem 152 communicating over an Ethernet connection 162, and a remote control or IR blaster 154 communicating over a serial bus 164. Also included are a digital VCR, camcorder, printer, or portable audio video player communicating with the media center 100 over a FireWire™ connection 166. Alternately, one or more or other device may be in communication with media center 100 over a wireless connection.

Various embodiments of the present invention may utilize one of a number of operating systems. For example, a specific embodiment of the present invention is capable of operating using one or more of the Windows™ operating systems such as Windows XP. Other embodiments use a version of the Linux operating system, for example, Forceware, available from NVIDIA Corporation in Santa Clara, Calif. In this specific example, Forceware provides audio and video codecs, navigators (for DVD, for example), streaming, platform independent modules, Microsoft™ Windows Directshow, and Linux, Windows, and handheld specific applications.

This specific example shows a DMP 160 as the centerpiece of a media center 100. DMPs included in navigation, set-top box, pachinko machine, or other applications may be also improved by the incorporation of embodiments of the present invention. Alternately, other integrated circuits may be improved by the incorporation of embodiments of the present invention, or the invention may be formed on its own integrated circuit.

While embodiments of the present invention may be particularly suited to NVIDIA's DMP devices, other circuits manufactured by NVIDIA and other parties may be improved by the incorporation of embodiments of the present invention. The DMP designed and developed by NVIDIA is a highly sophisticated circuit that includes, among several other circuits, processors for video, graphics, and audio. More details of this device can be found in copending U.S. patent application Ser. No. 11/058,743, filed Feb. 14, 2005, titled Digital Media Processor, which is incorporated by reference. For clarity, most of the circuits on the DMP can be omitted. A greatly simplified block diagram showing only the immediately relevant circuits is shown in the next figure.

Figure 2:
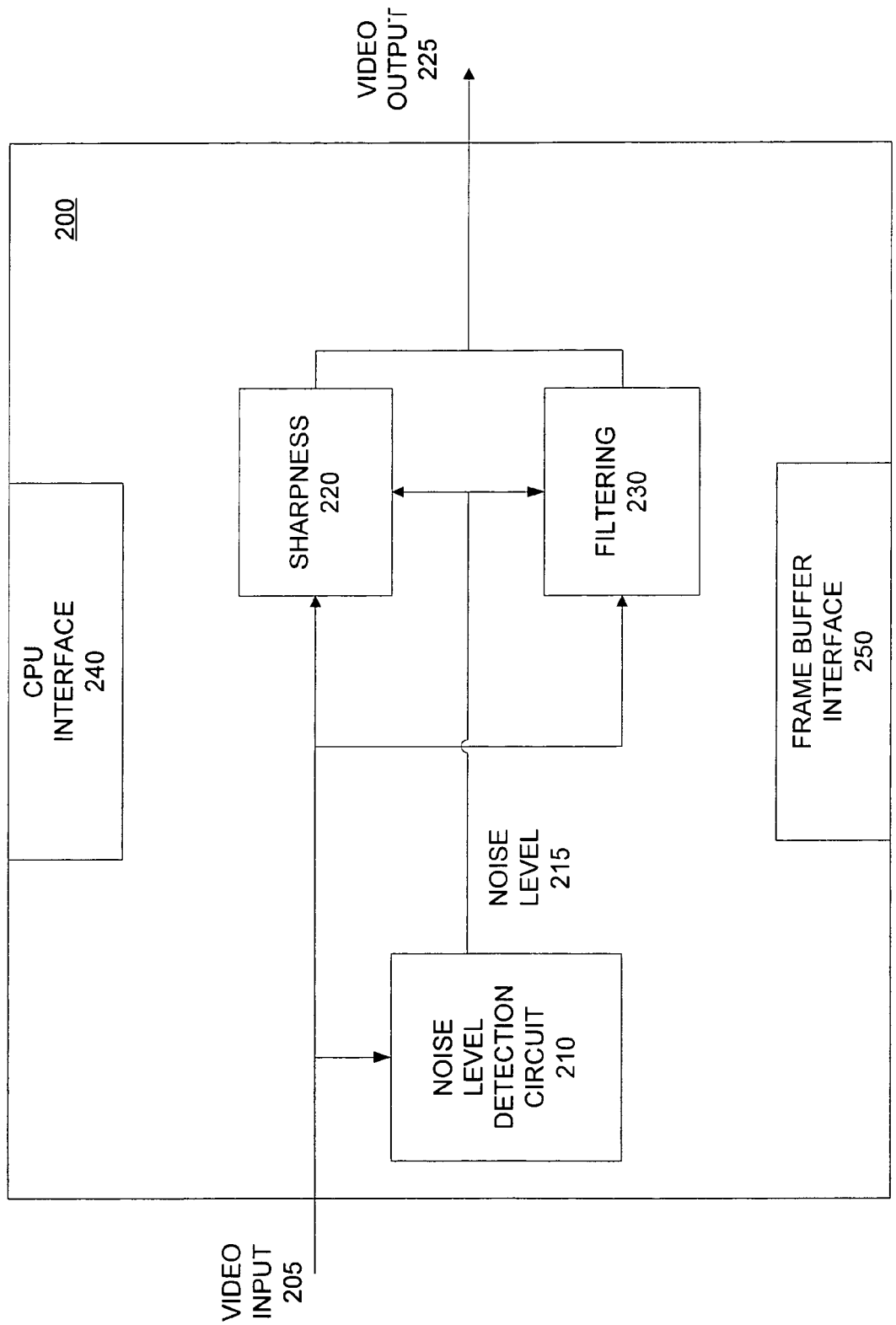
FIG. 2 is a block diagram of a portion of a Digital Media Processor (DMP) according to an embodiment of the present invention.

FIG. 2 is a block diagram of a portion of a DMP according to an embodiment of the present invention. The Digital Media Processor 200 includes a noise level detection circuit 210, sharpness circuitry 220, filtering circuitry 230 CPU, interface 240, and frame buffer interface 250. Other circuitry, such as graphics and audio processors, central processing units, motion estimators, and other circuitry may be included. A video input signal is received on line 205, and a video output signal is provided on line 225. These signals may be provided to other portions of the Digital Media Processor, or they may be input or output signals for the device.

The video input signal is received on line 205 by the noise level detection circuit 210. The noise level detection circuit 210 selects between the sharpness 220 and filtering circuits 230 for processing of the video signal. These circuits also receive the video input signal on line 205, and the selected circuit provides a video output signal on line 225. Various embodiments may use a multiplexer with inputs connected to the outputs of the sharpness circuit 220 and filtering circuit 230, where the inputs of the multiplexer are selected by the noise level detection circuit 210. Embodiments of the present invention may reduce power to, or power off, the unselected processing circuit.

The noise level detection circuit 210 receives the video input signal on line 205 and determines a noise level, which it provides on line 215. The noise level detection circuit 210 typically includes several circuits. For example, the noise level detection circuitry 210 may include an input circuit for receiving the video input on line 205. Comparison circuitry can be used to compare a first group of pixels in a frame with a second group of pixels in the frame. Several such comparisons can be made and provided to a noise level measurement circuit. This circuit processes, refines, or selects the comparison data and provides a noise level signal on line 215. This or a separate output can be provided by a selection circuit, which selects between the sharpness 220 and filtering circuits 230.

A sharpness circuit 220 processes the video input on line 205 when the noise level determined by the noise level detection circuit 210 is below a first threshold. When the noise is above this threshold, the filtering circuitry 230 filters the video input signal on line 205 and provides a video output signal on line 225. The amount of filtering provided by filtering circuit 230 can be made dependent on the measured noise level.

In this particular example, a decision is made whether to improve the sharpness or filter the noise in the video signal depending on the level of noise. In other embodiments, other decisions may be made, and other circuitry may be used and selected depending on the noise level. Moreover, while one threshold is used in this example to select between two circuits, other decision-making processes involving three or more or circuits may be made. Also, embodiments may make these decisions based on a comparison to one, two, or more than two thresholds.

The block diagram further includes a CPU interface 240 for communicating with a central processing unit and a frame buffer interface 250 for communicating with a memory. In various embodiments, some or all of the CPU and memory may be located either on or off the DMP 200.

The number of accesses performed by the frame buffer interface 250 is reduced by the incorporation of an embodiment of the present invention, since noise level measurements are based on pixel data for a given frame. That is, there is no need to compare pixel data of a one frame to pixel data for another frame. This preserves memory bandwidth for other functions performed by the Digital Media Processor 200.

Figure 3:
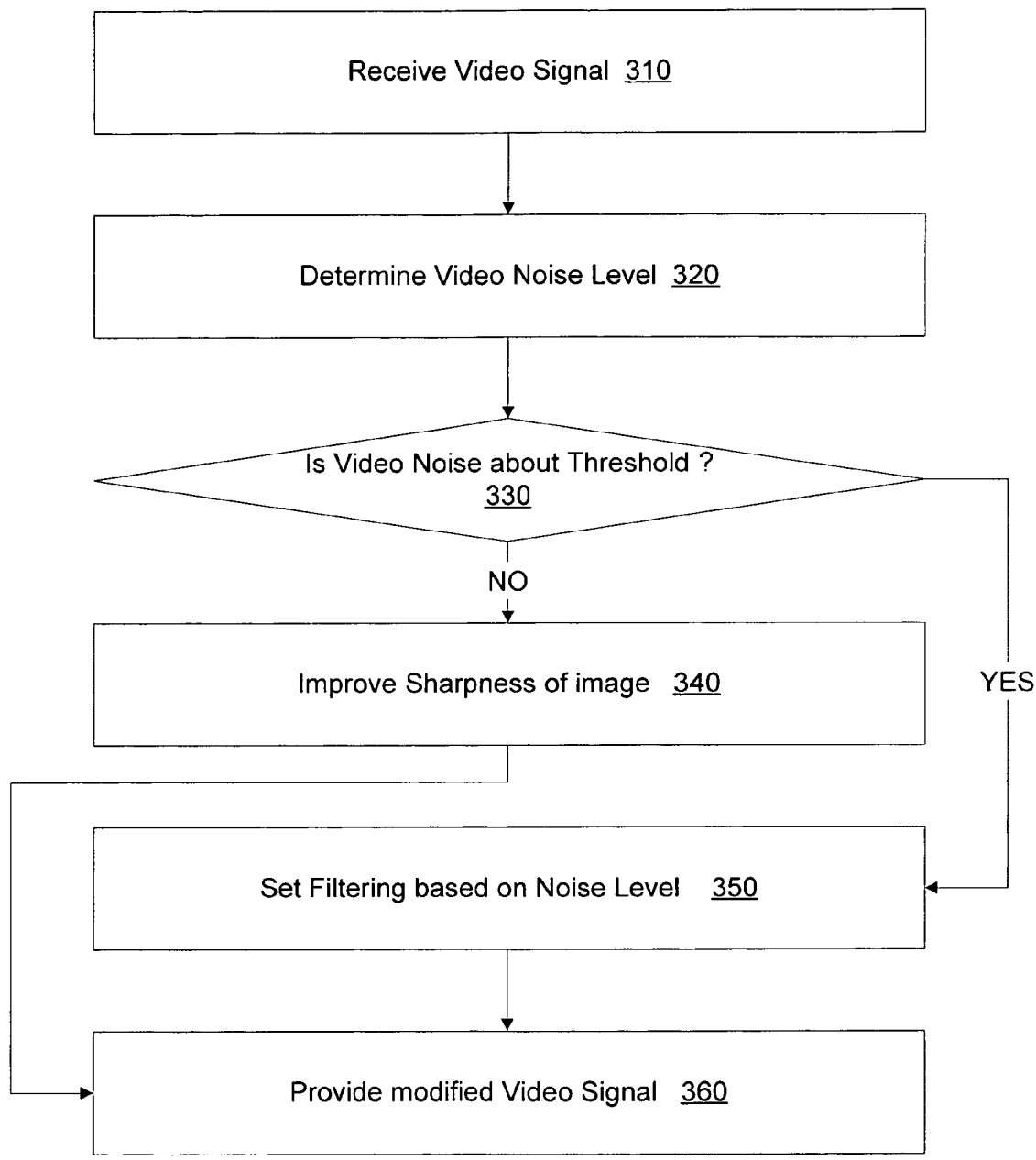
FIG. 3 is a flowchart illustrating a method of processing a video signal according to an embodiment of the present invention.

FIG. 3 is a flowchart illustrating a method of processing a video signal according to an embodiment of the present invention. In this method, a noise level of a video signal is determined. Based on the level of noise, a decision on how to further processes the video signal is made. The way in which the further processing is done may be dependent on the amount of measured noise. In this example, a decision is made whether to improve the sharpness of the signal or filter some of the noise. In other embodiments, other processes may be selected depending on the level of measured noise.

Specifically, in act 310, a video signal is received. A noise level for the video signal is determined in act 320. In act 330, it is determined whether the video noise is above a threshold. If the video noise is below the threshold, the sharpness of the image is improved in act 340. If the video noise is above the threshold, it is undesirable to sharpen this picture. Instead, in act 350, the video signal is filtered, and the level of filtering is based on the measured noise level. For example, various filtering coefficients may be set based on the measured noise level. The processed video signal is then provided in act 360, either to a monitor or other circuitry.

Unpleasant visual effects can occur if there are frequent variations in the type of processing being performed. For example, it could be disconcerting to a viewer if a video signal were to be sharpened and filtered on a rapidly alternating basis.

To prevent this, a form of hysteresis can be used. For example, once a decision on the type of processing to use has been made, that state can be maintained unless conditions that call for the other processing to be used exist for a set amount of time. In one embodiment, if sharpening is being performed but the noise level rises above a threshold, sharpening continues to be performed until the noise level is above the threshold for the set amount of time. Alternately, the threshold itself can change depending on the current state. In one embodiment, if sharpness is being performed, the threshold is raised, making it less likely that a change in processing from sharpening to filtering will be made.

Embodiments of the present invention compare a first group of pixels in a frame with a second group of pixels in the frame. By not relying on pixel data from other frames, accesses to the frame buffer memory are reduced. Also, pixel data from the other frames do not need to be stored in the frame buffer for noise measurement purposes, thereby at least potentially freeing memory for other uses.

An exemplary embodiment of the present invention compares groups of pixels on adjacent lines. The underlying reasoning is that video images tend to be consistent from one line to the next, that is, a line of video tends to be similar to an adjacent line of video. This is particularly true when only a few pixels of a first line are compared to a few pixels on a second line. In a specific embodiment of the present invention, 32 pixels on a first line are compared with 32 pixels of an adjacent line. Once this comparison is done, another group of 32 pixels on the first line are compared with another group of 32 pixels on the adjacent line. Specifically, if the first comparison is between pixels 0 through 31 (the pixels numbered in order across a line), a second comparison compares pixels 1 through 32 of the first and second lines. Similarly, the next comparison compares pixels 2 through 33 on the two lines, and so on, for example until the end of the line. In other embodiments, other algorithms may be used and other numbers of pixels or pixel groups may be compared. The groups of pixels may be along lines or arranged in other patterns. In other embodiments, every second (or third or fourth depending on implementation details) line is compared, particularly when video expansion or pixel interpolation is used, as discussed below.

The minimum difference found among all these comparisons is stored. Storing only one minimum value for each line eliminates comparison data where the video image changes along a part or segment of a line. Some or all of the lines of the frame are compared in this way, and the minimum difference for each line is stored. These minimums can then be averaged, with the result being a first approximation of the noise present in the video signal.

In a specific embodiment, the RMS difference between two groups of pixels is stored. These values for each line are summed, and the result is divided by the number of lines compared. The square root of this is taken and used as a first approximation of the noise present in the video signal. In other embodiments of the present invention, other algorithms may be used.

In some embodiments, the noise level is determined every frame. In other embodiments, the noise level is determined on another periodic or aperiodic basis. For example, the noise level may be determined after some number of frames. In various embodiments of the present invention, video noise may be determined by averaging the noise measured over one or more frames. For example, a rolling average of noise measurement for several frames may be used to estimate the video noise. In various embodiments of the present invention, other algorithms may be used to determine the frequency at which noise measurements are made, as well as the number of frames that are used for each measurement.

Figure 4:
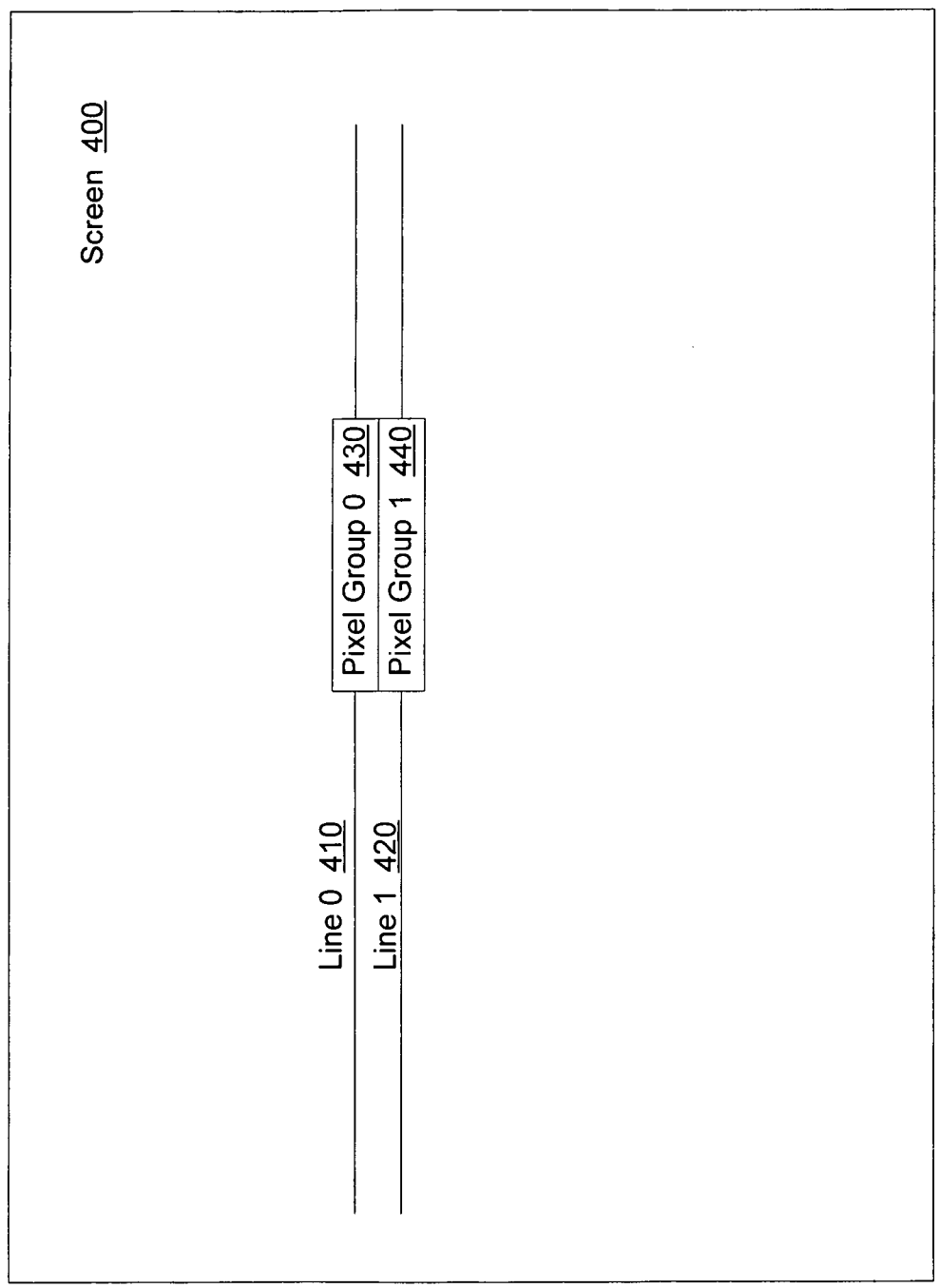
FIG. 4 illustrates pixels used in determining a video noise level according to an embodiment of the present invention.

FIG. 4 illustrates two groups of pixels used in determining a video noise level according to an embodiment of the present invention. In this figure, a frame is viewed on a screen 400. The frame includes Line 0 410 and Line 1 420. Two pixel groups, pixel Group 0 430 and pixel Group 1 440 are compared.

In a specific embodiment, the luminance of each pixel in Group 0 430 is compared to a corresponding pixel in Group 1 430. For example, each pixel may be compared to the pixel immediately below it on the next line, or a pixel 2, 4, or other number of lines below it, for example where pixels are interpolated, as described below. In other embodiments, the luminance of all the pixels in pixel Group 0 430 may be summed and compared to the luminance of the pixels in pixel Group 1 440. In other embodiments, other attributes of the pixels, such as the red, green, and blue color values may be compared.

An increasing number of televisions and other display apparatus are high-definition. Unfortunately, many video sources still provide low-definition images. These low-definition images are typically expanded to fill a high-definition TV screen. Expansion may be by pixel interpolation or other methods. When interpolation is performed, the noise between pixels can become correlated. This correlation effects noise measurements done in accordance with embodiments of the present invention. Accordingly, this is accounted for and pixels are compared on an appropriate basis.

FIGS. 5A and 5B illustrate the conversion of a standard video signal into a higher resolution video signal. In FIG. 5A, a low-definition video image 510 is expanded to fill a high-definition video image 520.

FIG. 5B illustrates an example where pixel A 550 is expanded into four pixels, A0 560, A1 562, A2 564, and A3 566. The values of one or more of these four pixels may be interpolated values. For example, pixel A1 562 may be an average value of pixel A 550 and an adjacent pixel, for example a pixel immediately to the right of pixel A 550. Pixel A2 564 and pixel A3 566 may similarly be interpolated values between pixel A 550 and pixels immediately below pixel A 550, and below and to the right of pixel A 550.

Noise measurements can be made either before or after this interpolation, depending on the implementation details. If noise measurements are performed after this interpolation, since noise on pixel A 550 translates into correlated noise on the four pixels A0 560, A1 562, A2 564, and A3 566, a typical embodiment of the present invention compares pixel A0 560 not to pixel A2 564, but rather a another pixel (not shown) below pixel A2 564.

Figure 6:
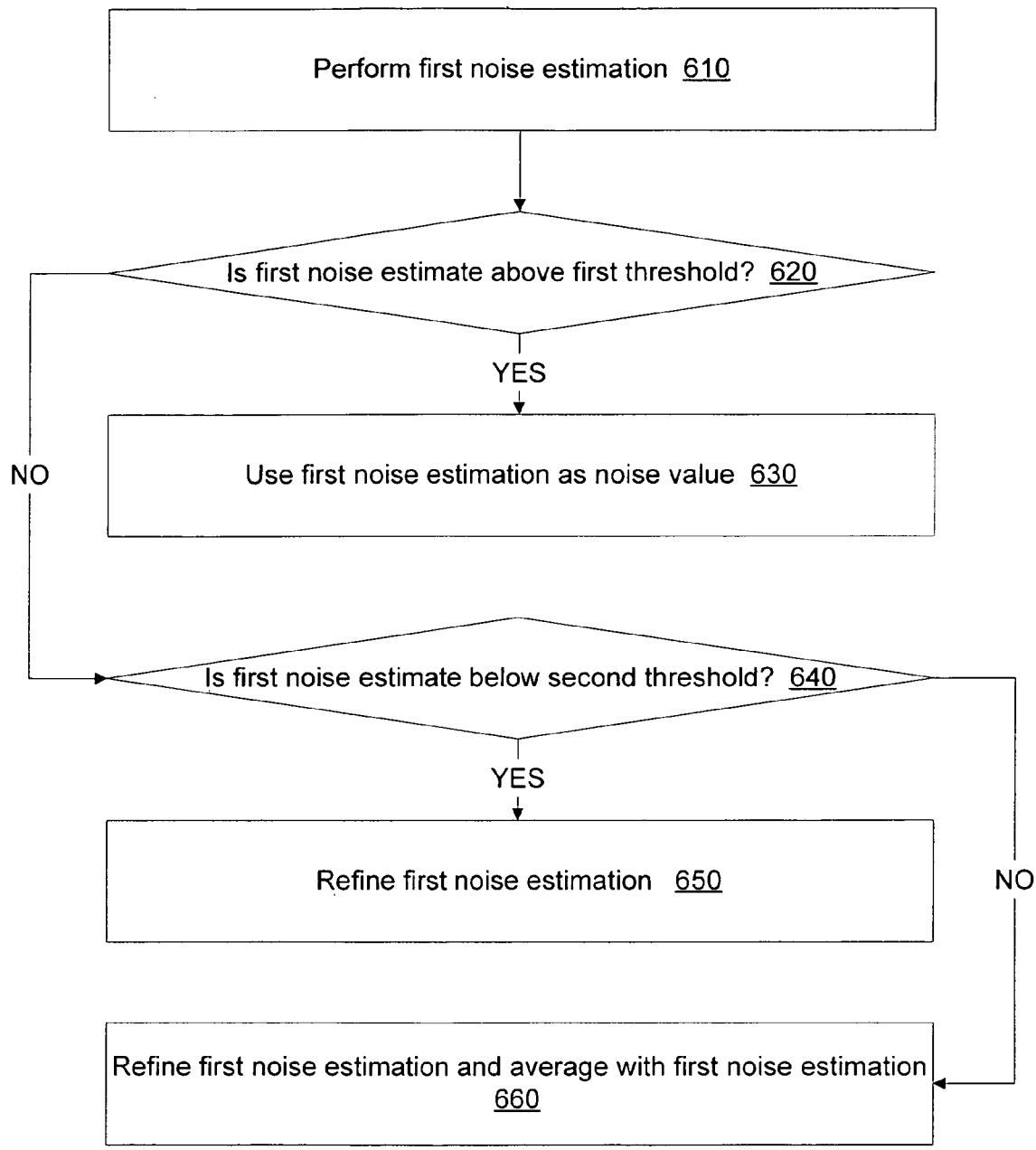
FIG. 6 is a flowchart illustrating a method of determining a video noise level according to an embodiment of the present invention.

FIG. 6 is a flowchart illustrating a method of determining a video noise level according to an embodiment of the present invention. In this embodiment, after a first noise estimation is made, a decision on whether and how to further refine the noise measurement is made. In this specific example, if the determined noise level is high, the determined noise level as used as is. However, if the noise level is low, a further refinement to the noise measurement as outlined above is used. If the noise is somewhere in between, an average of the two is used. Other embodiments of the present invention may use other algorithms.

Specifically, in act 610, a first noise estimation is performed. In act 620, it is determined whether the first noise estimate is above a first threshold. If it is, then the first noise estimation is used in act 630. It is not, it is determined whether the first noise estimates is below a second threshold. If it is below the second threshold, the first noise estimation is refined in act 650. If it is not, then the first noise estimation is below the first threshold and above the second threshold. In this case, the first noise estimation is refined and averaged with the first noise estimation in act 660.

In other embodiments of the present invention, if the first noise estimate is above the first threshold, a refinement of the first noise estimation may also be performed. Alternately, only one threshold, or more than two thresholds may be used. For example, one threshold may be used, and when a measured noise estimate is below the threshold, the noise estimate can be further refined.

As with the process where a decision to sharpen or filter a video signal is made, this flowchart can also benefit by the inclusion of hysteresis. For example, once a method to determine noise is made, that decision can be maintained for a set amount of time following a change to a noise level that would otherwise result in a different method being used. Alternately, either or both of the thresholds can be varied depending on the current state.

For example, if the noise is low initially, but increases, the refined method of determining noise can be used for a set amount of time before one of the other methods is used. Alternately, the second threshold can be raised, making it more likely that changes in noise do not lead to a change in measurement method. In most systems, it will be desirable to allow the measurement method to change at a faster rate than the type of processing (i.e. sharpness or filtering) is allowed to change at.

Various embodiments of the present invention may use one or more methods of refining initial noise measurements to achieve a higher degree of accuracy. For example, the measurement data may be subjected to a selection process where data that meets a criteria being used in the refined noise measurements. Two such selection processes and their criteria are described below. These selection processes may be used whether the original measurement data is generated from one or more frames of pixels.

Figure 7:
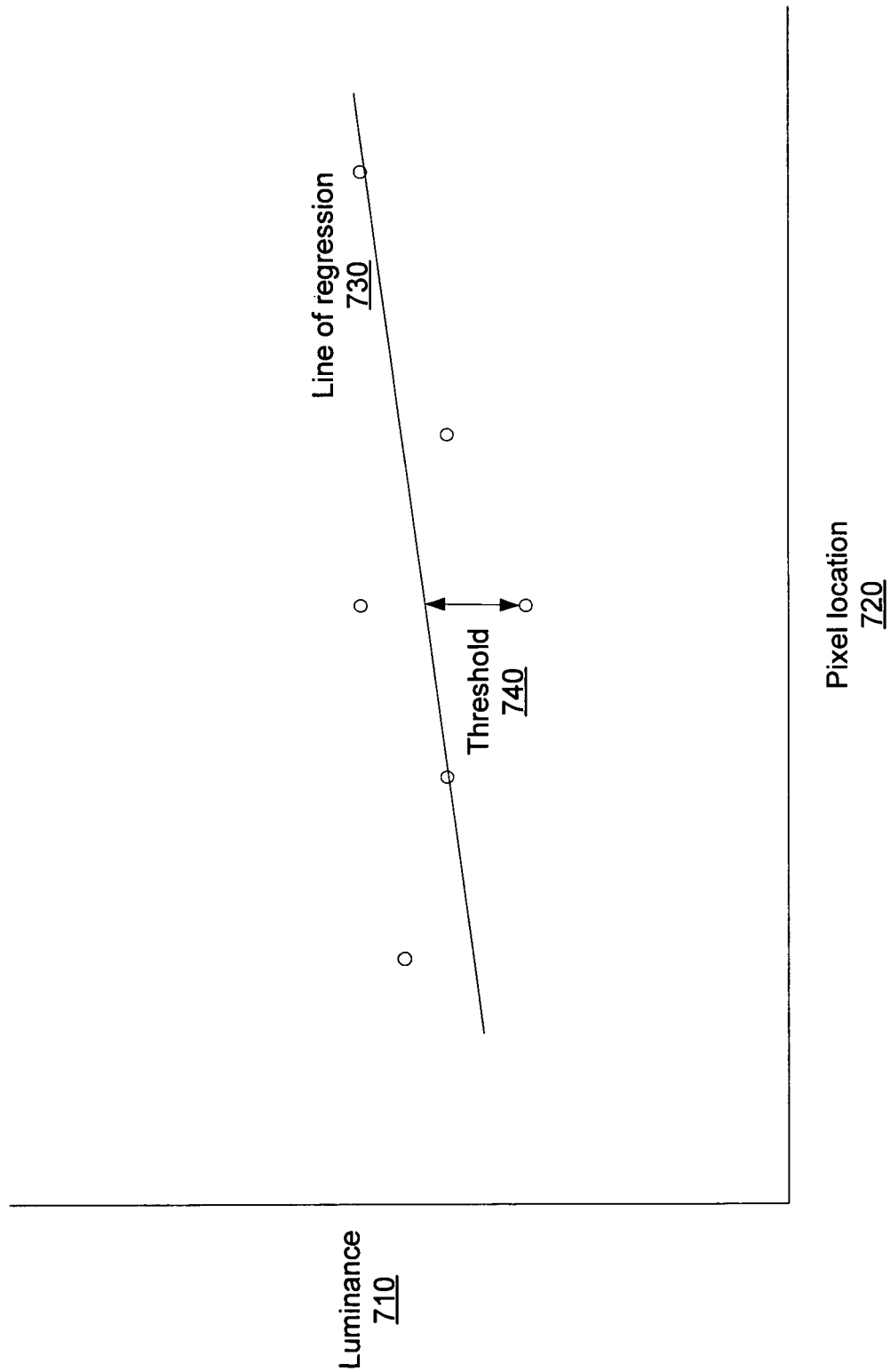
FIG. 7 illustrates a method of selecting measurement data while determining a video noise level according to an embodiment of the present invention.

FIG. 7 illustrates one such method of selecting measurement data while determining a video noise level according to an embodiment of the present invention. The underlying rationale is that line segments that are flat in terms of luminance make superior candidates for accurate noise measurements. Accordingly, only line segments where the luminance is sufficiently flat are used in determining a video noise level, other segments are discarded.

This graph illustrates pixel luminance 710 along a Y-axis for a number of pixels located along a line in a video frame. The pixel location is graphed along the X-axis 720. A line of regression 730 is determined for the luminance 710 of the pixels. It is then determined whether the luminance for each of the pixels in the group is within a threshold 740 of the line of regression. If they are, then this line segment has a sufficiently flat luminance and may be used in noise calculations.

More specifically, in a specific embodiment, the minimum comparison for each line is stored. When the noise level is low, the pixels for these minimums are examined for flatness. Each minimum that meets the criteria is used in the noise calculations. Those that do not meet the criteria are not used.

In various embodiments, the criteria may be checked at different times. For example, a noise estimation for one frame may be performed. If the noise is low, the comparison data for that frame may be refined and the noise level estimation adjusted accordingly. In other embodiments, a determination of a low noise level is made over one or more frames. Comparison data for further frames is then subject to this further refinement. Other criteria may be used in this or similar manners. Another selection process and its criteria are described with regards to the following figure.

Figure 8:
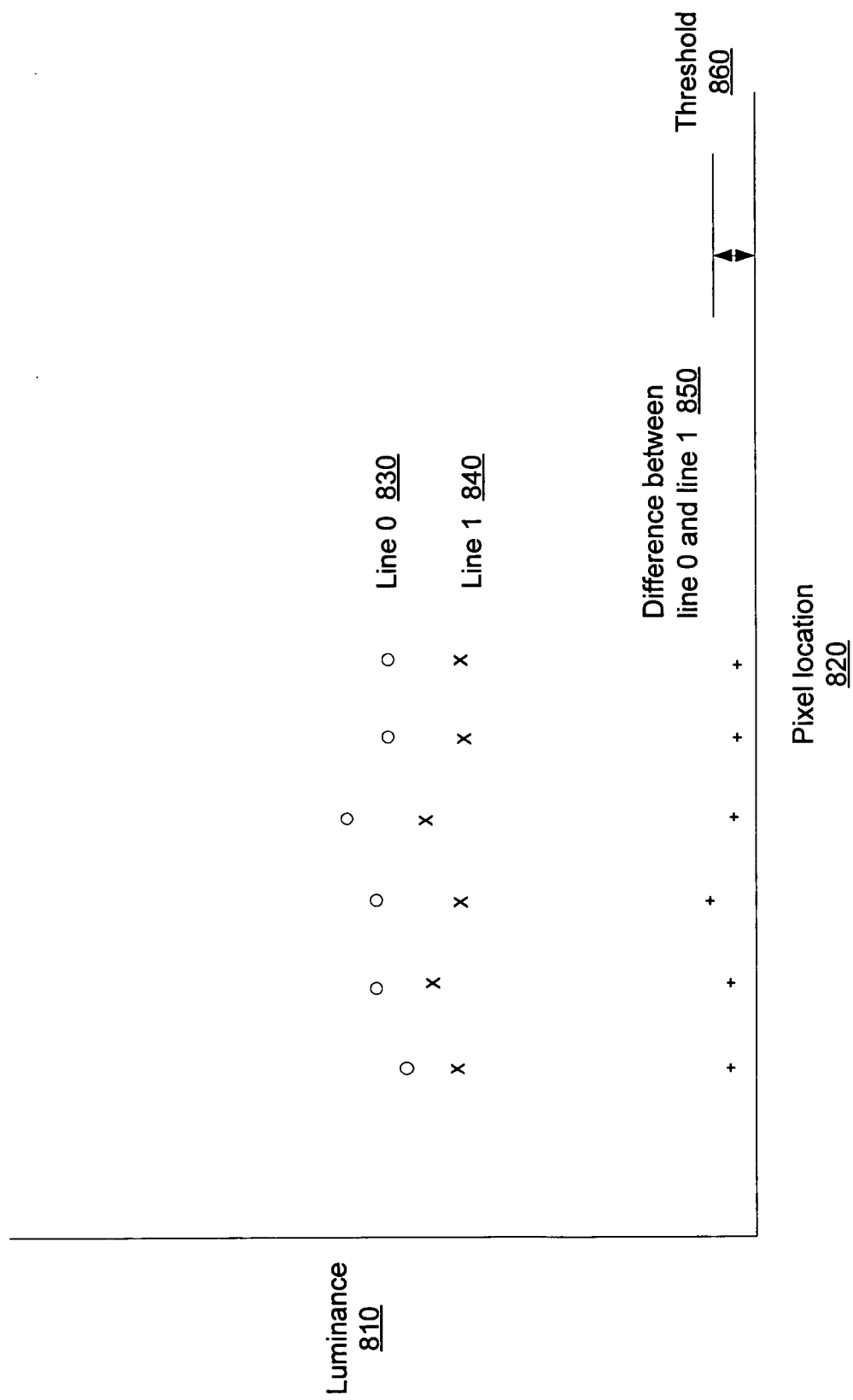
FIG. 8 illustrates another method of selecting measurement data while determining a video noise level according to an embodiment of the present invention.

FIG. 8 illustrates another method of selecting measurement data while determining a video noise level according to an embodiment of the present invention. This method may be used alone or in conjunction with the method shown in FIG. 7 or with other methods to further refine video noise measurements. The underlying rationale is that if the luminance of a line segment tracks a corresponding segment in adjacent line (for example, the segment directly below it), then it is a good candidate for use in noise measurements. If two line segments do not track to a sufficient degree, the comparison is discarded and not used in noise calculations.

This graph illustrates the luminance 810 of two line segments along a Y-axis for a first group of pixels on Line 0 830, and a second line of pixels Line 840. The pixel location is graphed along X-axis 820. The difference 850 between the luminance of the pixels on Line 0 and Line 1 is also graphed. If these differences are within a threshold 860, the two line segments sufficiently track each other and this comparison may be used in the noise calculations. If a difference is outside this threshold, the comparison is discarded.

The noise found by these measurements is typically assumed to be Gaussian. If this approximation is correct, then the greater the number of samples or comparisons taken, the closer to zero the average of the samples becomes. The tendency of the average of a number of Gaussian data points to go to zero is well understood and can be expressed mathematically and graphically. Also, the number of samples used changes when the comparisons undergo refinements such as those shown in FIGS. 7 and 8. Accordingly, for a given a number of samples and measured noise level, the actual noise can be determined.

Figure 9:
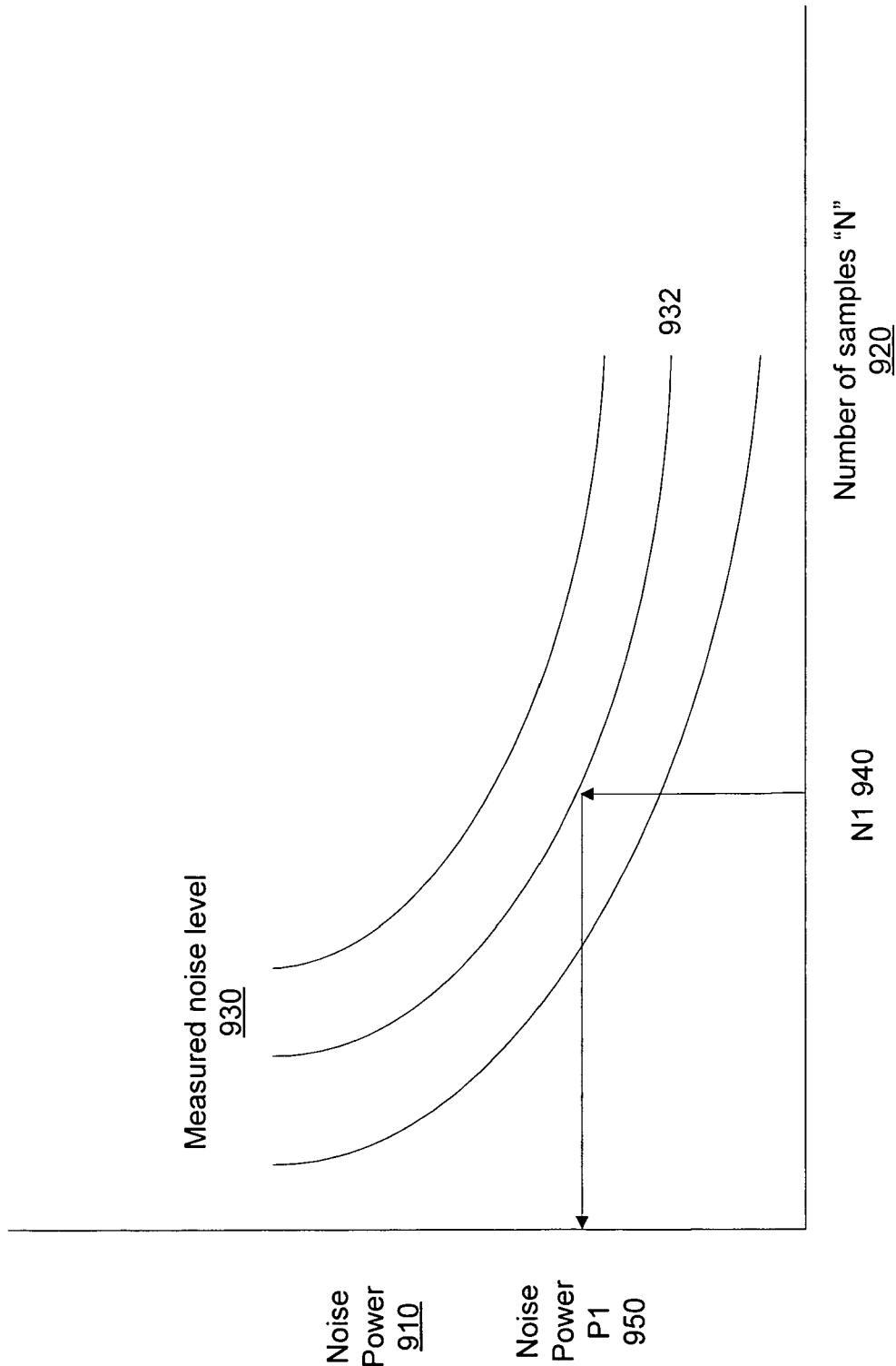
FIG. 9 illustrates a method of determining a video noise level after a selection of measurement data has been made according to an embodiment of the present invention.

FIG. 9 illustrates a method of determining a video noise level after a selection of measurement data has been made according to an embodiment of the present invention. Noise power is graphed along a Y-axis 910 as a function of a number of samples along an X-axis 920. Again, the value of Gaussian noise averaged over an increasing number of samples tends toward zero. This characteristic is graphed as noise levels 930.

Given a measured noise level and a number of samples "N," the actual noise power can be found. While in this example the value is found graphically, in practical circuits it can be found using an algorithm, lookup table, or other appropriate method. Specifically, one of the curves 930 is selected based on the measured noise level. In this example, a noise level corresponding to curve 932 was measured using N1 samples. The number of samples N1 is found along the X-axis 920. An intersection of the measured noise, curve 932, and the number of samples N1 940 is found. From this, the corresponding noise power P1 950 can be found. This noise level can then be used in determining what to processing the video signal should undergo.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of determining a video signal's noise level, the video signal comprising a series of frames, the method comprising:
   receiving a first video signal portion, the first video signal portion comprising a plurality of pixels corresponding to a first frame;
   comparing a first set of the plurality of pixels corresponding to the first frame with a second set of the plurality of pixels corresponding to the first frame;
   using the comparison in determining a noise level of the video signal portion; and
   if the determined noise level is below a first threshold, then improving a second video signal portion's sharpness, the second video signal portion corresponding to a second frame, the second frame subsequent to the first frame.

2. The method of claim 1 wherein the video signal's noise level is determined using the first video signal portion corresponding to the first frame and without using video signal portions corresponding to other frames in the video signal.

3. The method of claim 1 further comprising:
   if the determined noise level is above the first threshold, then filtering the second video signal portion.

4. The method of claim 3 wherein a level of the filtering is dependent on the determined noise level.

5. The method of claim 1 wherein the first set of the plurality of pixels forms a portion of a first line and the second set of the plurality of pixels forms a portion of a second line.

6. The method of claim 1 wherein the first line and the second line are adjacent lines.

7. The method of claim 6 wherein the comparing of the first set of the plurality of pixels and the second set of the plurality of pixels comprises comparing the luminance of each one of the first set of plurality of pixels with a corresponding one of the second set of plurality of pixels.

8. The method of claim 1 wherein when a first criteria is met, the noise is determined by:
   determining a line of regression for the first set of the plurality of pixels' luminance; and
   determining whether each of the first set of the plurality of pixels' luminance is within a second threshold of the line of regression.

9. The method of claim 1 wherein when a first criteria is met, the noise is determined by:
   determining whether each of the first set of the plurality of pixels' luminance is within a first threshold of a corresponding one of the second set of the plurality of pixels' luminance.

10. An integrated circuit comprising:
    a noise measurement circuit coupled to receive a video signal comprising a series of frames, the noise measurement circuit configured to determine a video noise level of the video signal;
    a first video processing circuit coupled to the noise measurement circuit, wherein the first video processing circuit is configured to improve a video signal's sharpness;
    a second video processing circuit coupled to the noise measurement circuit;
    wherein the noise measurement circuit comprises:
        input circuitry configured to receive a first frame in the video signal;
        comparison circuitry configured to compare a first group of pixels in the first frame with a second group of pixels in the first frame;
        noise level determination circuitry configured to determine a level of noise based on comparisons done by the comparison circuit; and
        selection circuitry configured to select the first video processing circuit or the second video processing circuit based on the determined noise level.

11. The integrated circuit of claim 10 wherein the comparison circuitry is further configured to determine a line of regression for the first group of pixels' luminance, and further configured to determine whether each pixels' luminance is within a threshold of the line of regression.

12. The integrated circuit of claim 10 wherein the comparison circuitry is further configured to determine whether each of the first group of pixels' luminance is within a threshold of a corresponding one of the second group of pixels' luminance.

13. The integrated circuit of claim 10 wherein the second video processing circuit is configured to filter noise in a video signal.

14. The integrated circuit of claim 13 wherein a level of the noise filtering is dependent on the level of noise measured.

15. The integrated circuit of claim 10 wherein the luminance of each one of the pixels in the first group is compared to the luminance of a corresponding pixel in the second group, and wherein the first group of pixels is a part of a first line and the second group of pixels is a part of a second line.

16. A method of determining a video signal's noise level, the video signal comprising a series of frames, the method comprising:
    receiving a video signal portion, the video signal portion comprising a plurality of pixels;
    comparing each of a first set of the plurality of pixels' luminance with a corresponding one of a second set of the plurality of pixels' luminance to determine a first noise estimation;

if the first noise estimation is above a first threshold, then using the first noise estimation;

if the first noise estimation is below a second threshold, the second threshold lower than the first threshold, then refining the first noise estimation; and if the first noise estimation is between the first threshold and the second threshold, then refining the first noise estimation and averaging the first noise estimation and the refined first noise estimation.

17. The method of claim 16 wherein the first noise estimation is refined by:

determining a line of regression for the first set of the plurality of pixels' luminance; and determining whether each of the first set of the plurality of pixels' luminance is within a third threshold of the line of regression.

18. The method of claim 16 the first noise estimation is refined by:

determining whether each of the first set of the plurality of pixels' luminance is within a second threshold of a corresponding one of the second set of the plurality of pixels' luminance.

19. The method of claim 16 wherein the plurality of pixels correspond to a first frame.

20. The integrated circuit of claim 16 wherein the first set of the plurality of pixels is a part of a first line and the second set of the plurality of pixels is a part of a second line, and wherein the first and second lines are lines in the first frame.

* * * * *